(12) United States Patent
Yoshida et al.

(10) Patent No.: US 8,233,029 B2
(45) Date of Patent: Jul. 31, 2012

(54) REPRODUCTION APPARATUS AND SYSTEM

(75) Inventors: Junji Yoshida, Osaka (JP); Masazumi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 1555 days.

(21) Appl. No.: 11/661,414

(22) PCT Filed: Jul. 14, 2006

(86) PCT No.: PCT/JP2006/314047
§ 371 (c)(1), (2), (4) Date: Feb. 28, 2007

(87) PCT Pub. No.: WO2007/026473
PCT Pub. Date: Mar. 8, 2007

(65) Prior Publication Data
US 2007/0274684 A1 Nov. 29, 2007

(30) Foreign Application Priority Data
Aug. 31, 2005 (JP) .................. 2005-252515

(51) Int. Cl.
H04N 7/14 (2006.01)
H04N 5/268 (2006.01)
H04N 9/80 (2006.01)
H04N 5/932 (2006.01)
H04N 5/935 (2006.01)
H04N 5/765 (2006.01)

(52) U.S. Cl. .............. 348/14.11; 348/705; 386/215; 386/216; 386/217; 386/218; 386/219; 386/234; 386/239; 386/248

(58) Field of Classification Search .............. 386/215, 386/216, 217, 218, 219, 234, 239, 248; 348/14.11, 348/705
See application file for complete search history.

(56) References Cited

U.S. PATENT DOCUMENTS
2002/0054028 A1 5/2002 Uchida et al.
2006/0233145 A1* 10/2006 Jang et al. .............. 370/341

FOREIGN PATENT DOCUMENTS
| CN | 1336768 | 2/2002 |
| JP | 2000-032359 | 1/2000 |
| JP | 2000-350131 | 12/2000 |
| JP | 2003-052001 | 2/2003 |

OTHER PUBLICATIONS

High-Definition Multimedia Interface, Specification Version 1.1, May 20, 2004.*
High-Definition Multimedia Interface Specification Version 1.1, "CEC 13.1 One Touch Play", "CEC 13.12 Routing Control", May 20, 2004.

* cited by examiner

*Primary Examiner* — Daquan Zhao
(74) *Attorney, Agent, or Firm* — Wenderoth, Lind & Ponack, L.L.P.

(57) ABSTRACT

The present invention provides a reproduction apparatus capable of automatically switching an input of a television to an output from a broadcast receiver such as an STB. A television, upon receiving a notification command notifying that output of video or audio is to start, switches its input to an output from an apparatus which has sent the notification command. An STB, upon receiving an instruction command instructing that output of video or audio should be started, sends the notification command to the television. A DVD recorder includes: a decoder that reproduces video or audio recorded in a DVD-RAM disc; a data output I/F that outputs the reproduced video or audio to the television; and a command sending and receiving I/F that sends the instruction command to the STB when the output of the reproduced video or audio ends.

6 Claims, 13 Drawing Sheets

| Manufacturer | Model | Version |
|---|---|---|
| Company A | ABC | Ver. ○○ |
|  | DEF | Ver. ×× |
| Company B | GHI | Ver. △△ |
|  |  |  |

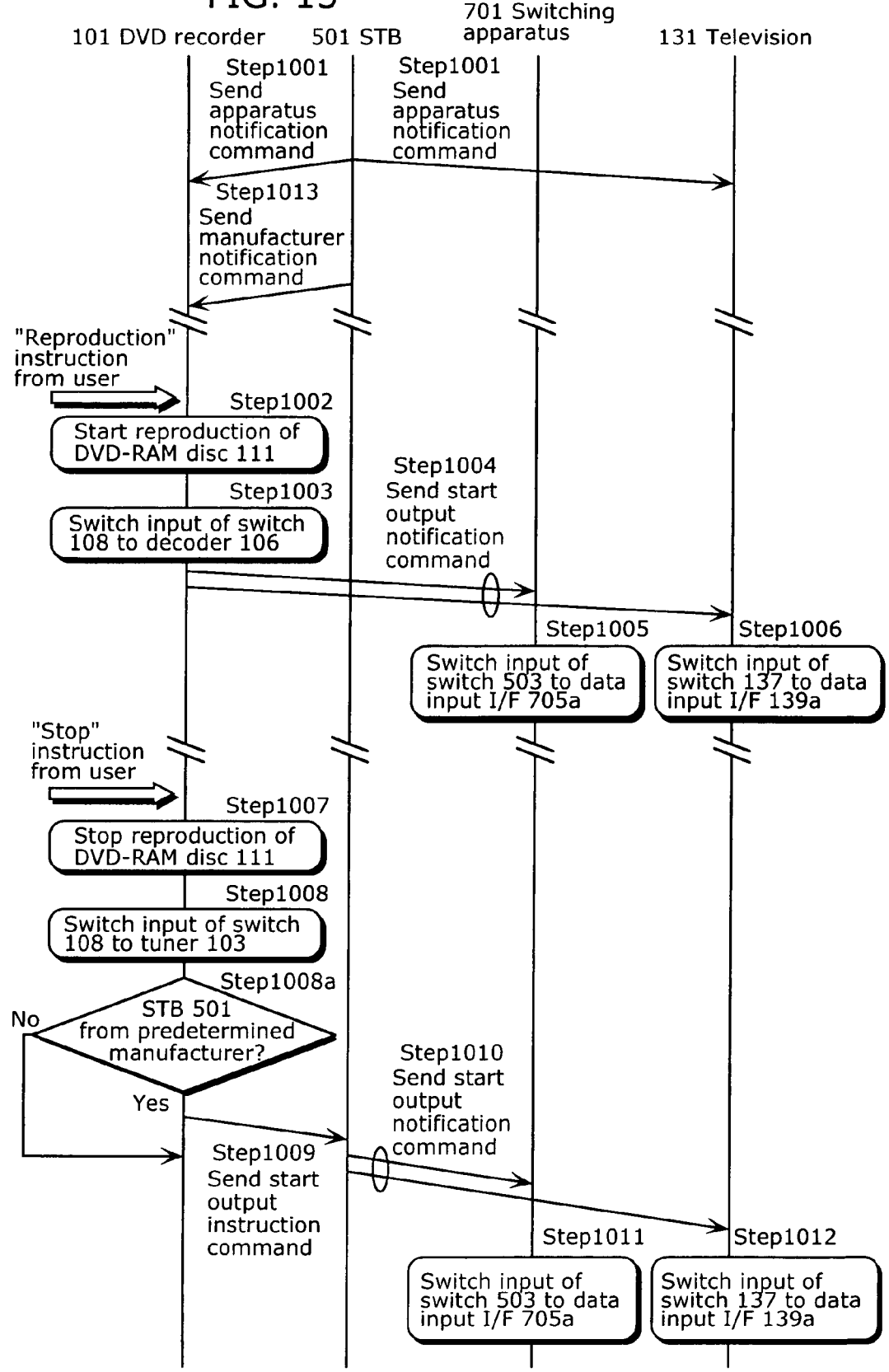

REPRODUCTION APPARATUS AND SYSTEM

TECHNICAL FIELD

The present invention relates to a reproduction apparatus that reproduces video or audio, and particularly to technology for automatically switching the input of a television in a situation where the reproduction apparatus is connected to the television.

BACKGROUND ART

Nowadays, the use of televisions is not limited to the reception and viewing of television broadcasts, and they are used for a variety of purposes. For example, by connecting a digital video recorder (DVR) such as a video tape recorder (VTR) and a DVD recorder to a television, it is possible to view contents reproduced by these external apparatuses, and by connecting a home-use game machine, it is possible to enjoy playing games. For this reason, many televisions are equipped with one or more external input terminals, in addition to an antenna terminal for receiving television broadcasts. A user can switch between these input terminals by operating buttons on a remote control or the television body.

Televisions equipped with a number of external input terminals (many of which are high-end televisions) have an advantage of being able to simultaneously connect to a number of external apparatuses such as a DVR and a home-use game machine. On the other hand, there is a drawback in that operations become complicated since it is necessary to manually switch inputs.

Meanwhile, many recent VTRs and DVRs include a tuner, and thus are capable of receiving television broadcasts. When contents reproduction is not carried out in such a VTR and a DVR, it is common that a television broadcast received by the tuner is outputted to the television.

As thus described, it is possible to view a television broadcast even when the input of the television is set to the VTR. However, in the case where the recording of an analog terrestrial television broadcast is carried out, for example, when the input of the television is set to the VTR, it is not possible to view an analog terrestrial television broadcast of another channel. In other words, in order to view a television broadcast of a desired channel, it is easier to use the tuner of the television than using the tuner of the VTR or DVR. In view of this, there exists technology for automatically switching the input of the television by transmitting a command between the television and an external apparatus.

For example, a reproduction device disclosed in Patent document 1 identified below sends an instruction signal to a television when the reproduction device starts reproduction. This instruction signal is a signal for switching the input of the television to an output terminal of the television to which the output terminal of the reproduction device is connected. Furthermore, when entering a power-off state, this reproduction device sends, to the television, a signal to instruct that the input of the television should be switched to the antenna or tuner. This makes it possible to display the reproduced video onto the screen of the television, when the reproduction device starts reproduction, and to display the video received by the antenna or tuner of the television onto the screen of the television, when the reproduction device enters a power-off state.

Note that the AV.link standard (Non-patent document 1 identified below) specifies commands to allow the interoperability between a television, a VTR, and the like. According to this standard, the VTR issues a predetermined command to the television, when the VTR starts reproduction or when the VTR displays a menu screen. This makes it possible to cause the television to transit from the stand-by state to a state in which the television can display a screen of the VTR.

Patent document 1: Japanese Laid-Open Patent Application No. 2000-350131
Non-patent document 1: CENELEC AV.link (EN50157-1, EN50157-2-1, EN50157-2-2, and EN50157-2-3)

DISCLOSURE OF INVENTION

Problems that Invention is to Solve

Meanwhile, by connecting a broadcast receiver such as a set-top box (STB) to a television, it is possible to view a cable television broadcast and the like received by the STB. In many such cases, the input of the television is set to the STB in order to view cable television broadcasts.

However, according to the conventional technology disclosed by Patent document 1, there is a problem that, even in the case where a cable television broadcast received by the STB is viewed, the screen of the television switches to that of a television broadcast (analog terrestrial television broadcast) received by the tuner of the television when the reproduction device enters a power-off state.

The present invention has been conceived in view of the above problem, and it is an object of the present invention to provide a reproduction apparatus capable of automatically switching the input of a television to an output from a broadcast receiver such as an STB.

Means to Solve the Problems

In order to achieve the above object, the reproduction apparatus according to the present invention is a reproduction apparatus that reproduces video or audio data, the apparatus being connected to a first apparatus and a second apparatus, wherein upon receiving a notification command notifying that output of video or audio data is to start, the first apparatus switches its input to receive an output from one of the reproduction apparatus and the second apparatus which has sent the notification command, and upon receiving an instruction command instructing that output of video or audio data should be started, the second apparatus sends the notification command to the first apparatus, and the reproduction apparatus includes: a reproduction unit that reproduces video or audio data recorded in a recording medium; a data output unit that outputs the reproduced video or audio data to the first apparatus; and a command sending unit that sends the instruction command to the second apparatus when the output of the reproduced video or audio data ends. With this structure, when the output of the reproduced video or audio data ends, the instruction command is sent from the reproduction apparatus to the second apparatus, and the notification command is sent from the second apparatus to the first apparatus, and the input of the first apparatus switches to an output from the apparatus that has sent the notification command (here, the second apparatus). In other words, it is possible to automatically switch the input of the first apparatus (e.g., television) to an output from the second apparatus (e.g., STB) when the output of the reproduced video or audio data ends.

Here, the second apparatus may send, to the reproduction apparatus, a connection command indicating that the second apparatus is connected to the first apparatus, and the command sending unit may send the instruction command to the second apparatus only in the case where the connection command has been received by the reproduction apparatus. With this structure, it is possible to send the instruction command to the second apparatus only in the case where the second apparatus is connected to the first apparatus.

The reproduction apparatus may further include a screen creation unit that creates a utility screen, wherein the data output unit may output the created utility screen to the first apparatus, and the command sending unit may send the instruction command to the second apparatus when the output of the created utility screen ends. With this structure, it is possible to automatically switch the input of the first apparatus (e.g., television) to an output from the second apparatus (e.g., STB) when the output of the utility screen ends, as in the case where the output of the reproduced video or audio data ends.

The second apparatus may send, to the reproduction apparatus, a manufacturer command, which is a command indicating a manufacturer of the second apparatus, and the command sending unit may send the instruction command to the second apparatus only in the case where the manufacturer indicated by the manufacturer command is determined by the reproduction apparatus to be a predetermined manufacturer. With this structure, it is possible to send the instruction command to the second apparatus only in the case where the manufacturer of the second apparatus is a predetermined manufacturer.

The reproduction apparatus may further include: a conversion unit that converts a received television broadcast into video or audio data in a predetermined format; and a recording unit that records the video or audio data obtained through the conversion into the recording medium. With this structure, it is possible to apply the present invention also to a recording/reproduction apparatus having recording function.

Note that, it is not only possible to embody the present invention as the reproduction apparatus described above, but also as a reproduction system in which the first apparatus and second apparatus described above are connected to such reproduction apparatus.

Effects of the Invention

As described above, according to the reproduction apparatus of the present invention, the input of the first apparatus automatically switches to an output from the second apparatus when the output of the reproduced video or audio ends or when the output of the utility screen ends. This eliminates the necessity to perform a complicated operation of switching the input of the first apparatus, and thus results in improved usability. What is more, since such switching is performed only in the case where the manufacturer of the second apparatus is a predetermined manufacturer, it is possible to prevent the occurrence of defects that are caused by the difference in manufacturers.

BRIEF DESCRIPTION OF DRAWINGS

FIG. 13 is a flowchart of the fourth embodiment.

NUMERICAL REFERENCES

Figure 1:
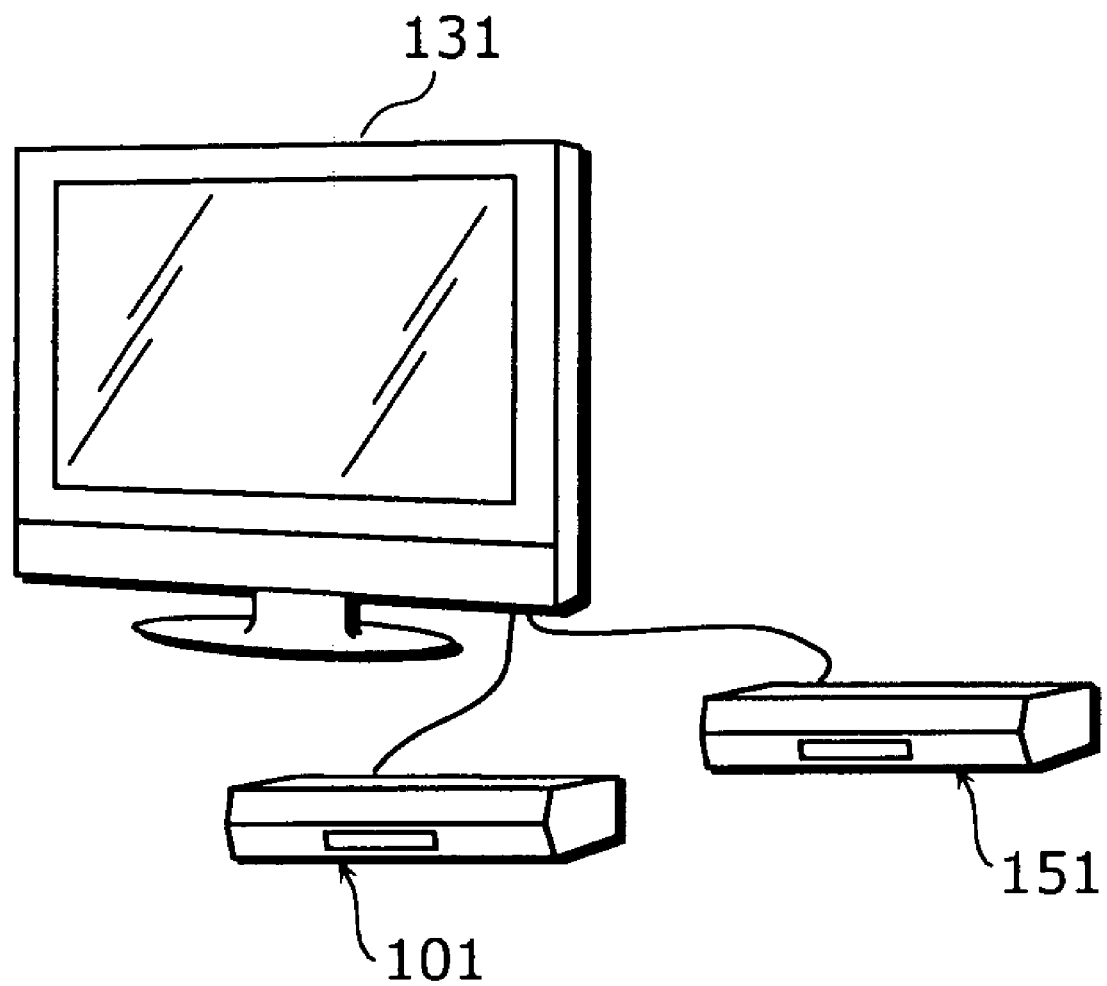
FIG. 1 is a diagram which shows an overview of a first embodiment.

101 DVD recorder
102, 102a Control unit
103 Tuner
104 Disc management unit
105 Encoder
106 Decoder
107 User operation unit
108 Switch
109 Data output I/F
110 Command sending-receiving I/F
111 DVD-RAM disc
112 Output processing unit
121 Antenna
122a, 122b, 122c Data cable
123a, 123b, 123c Command cable
131 Television
132 Screen
133 Speaker
134 Control unit
135 Output processing unit
136 Tuner
137 Switch
138 User operation unit
139a, 139b Data input I/F
140a, 140b Command sending-receiving I/F
151 STB
152 Control unit
153 Tuner
154 User operation unit
155 Output processing unit
156 Data output I/F
157 Command sending-receiving I/F
501 STB
502 Control unit
503 Apparatus information storage unit
701 Switching apparatus
702 Control unit
703 Switch
704a, 704b Command sending-receiving I/F
705a, 705b Data input I/F
706 Data output I/F

BEST MODE FOR CARRYING OUT THE INVENTION

Hereafter, embodiments of the present invention will be described in detail with reference to the drawings.

First Embodiment

FIG. 1 is a diagram which shows an overview of the first embodiment. Here, a state in which a DVD recorder 101 and an STB 151 are connected to a television 131 is shown. The DVD recorder 101 is one example of the reproduction apparatus of the present invention, the television 131 is one example of the first apparatus of the present invention, and the STB 151 is one example of the second apparatus of the present invention. The second apparatus is not limited to a broadcast receiver such as an STB, and thus any apparatus may be used as long as such apparatus is capable of outputting video/audio data.

Figure 2:
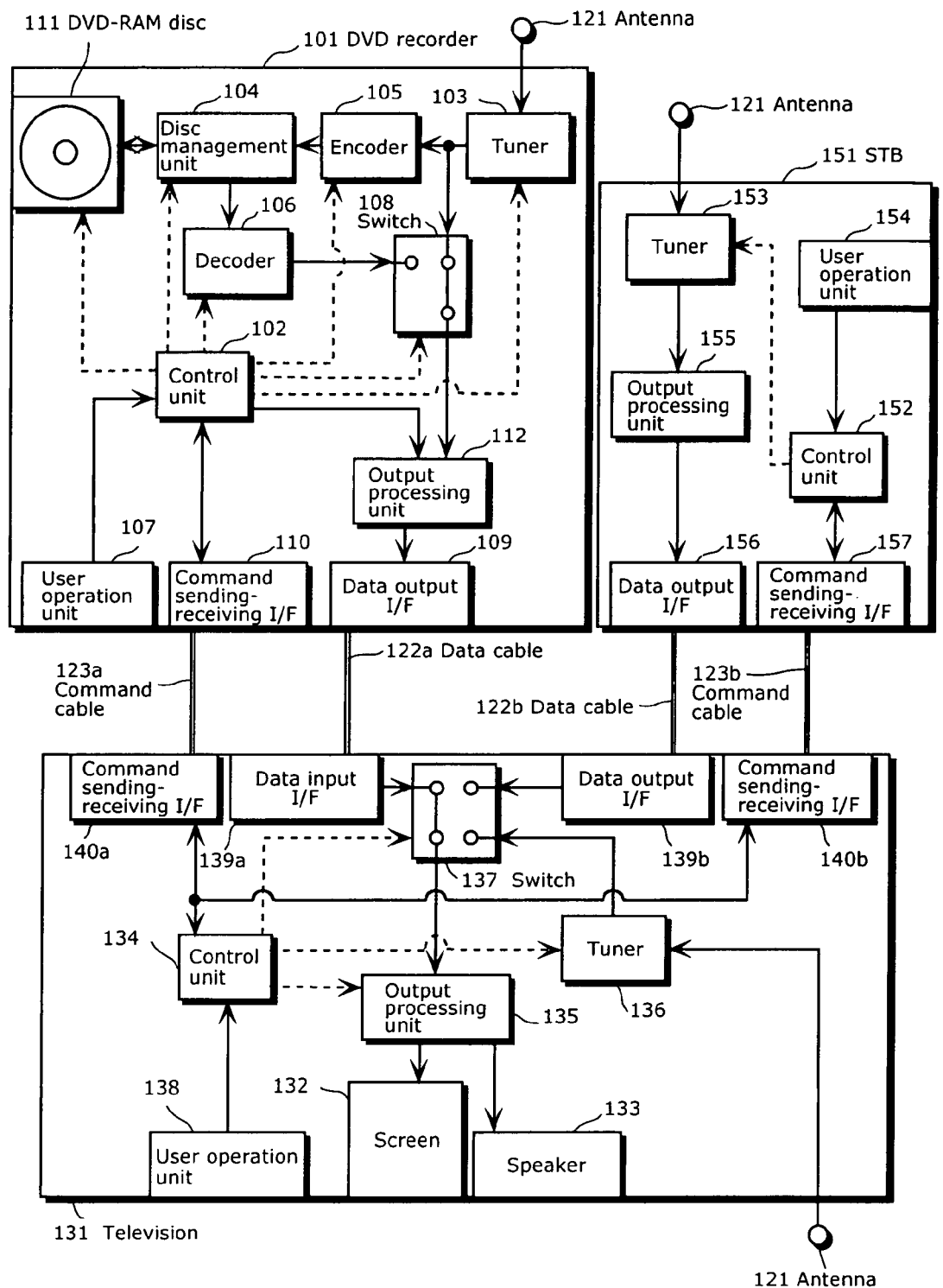
FIG. 2 is a diagram which shows an example structure of the first embodiment.

FIG. 2 is a diagram which shows example structures of the television 131, the DVD recorder 101, and the STB 151.

The DVD recorder 101 includes a control unit 102, a tuner 103, a disc management unit 104, an encoder 105, a decoder 106, a user operation unit 107, a switch 108, a data output I/F 109, a command sending-receiving I/F 110, a DVD-RAM disc 111, an output processing unit 112, an antenna 121, a data cable 122a, and a command cable 123a. The control unit 102 controls an operation of each component of the DVD recorder 101. The tuner 103 extracts video/audio data of a specified channel from a television broadcast received by the antenna 121. The disc management unit 104 writes and reads data to and from the DVD disc 111. The encoder 105 converts the video/audio data received from the tuner 103 into a format suitable for the recording into the DVD-RAM disc 111. The decoder 106 decodes the data recorded in the DVD-RAM disc 111. The user operation unit 107 is an operation button on the body of the DVD recorder 101, and a photo detector or the like which receives an instruction signal, such as an infrared signal, from the remote control operated by the user. The switch 108 selects one of the tuner 103 and the decoder 106. The data output I/F 109 outputs the video/audio data to the television 131 through the data cable 122a. The command sending-receiving I/F 110 sends and receives a command to and from the television 131 through the command cable 123a. The DVD-RAM disc 111 is one example of the recording medium. The output processing unit 112 processes the video/audio data, if necessary, and outputs the resultant data to the data output I/F 109. The antenna 121 receives a television broadcast. The data cable 122a is a D terminal cable, an S terminal cable, an RCA cable, a DVI cable, or the like for transmitting the video/audio data. The command cable 123a is an RS232C serial cable or the like for transmitting a command.

The television 131 includes a screen 132, a speaker 133, a control unit 134, an output processing unit 135, a tuner 136, a switch 137, a user operation unit 138, data input I/Fs 139a and 139b, command sending-receiving I/Fs 140a and 140b, and an antenna 121. The screen 132 outputs video. The speaker 133 outputs audio. The control unit 134 controls an operation of each component of the television 131. The output processing unit 135 processes the video/audio data, if necessary, and outputs the resultant data to the screen 132 or the speaker 133. The tuner 136 extracts the video/audio data of a specified channel from the television broadcast (analog terrestrial broadcast) received by the antenna 121. The switch 137 selects one of the data input I/F 139a, the data input I/F 139b, and the tuner 136. The user operation unit 138 is an operation button on the body of the television 131, and a photo detector or the like which receives an instruction signal, such as an infrared signal, from the remote control operated by the user. The data input I/F 139a receives the video/audio data from the DVD recorder 101 through the data cable 122a. The data input I/F 139b receives the video/audio data from the STB 151 through the data cable 122b. The command sending-receiving I/F 140a sends and receives a command to and from the DVD recorder 101 through the command cable 123a. The command sending-receiving I/F 140b sends and receives a command to and from the STB 151 through the command cable 123b.

The STB 151 includes a control unit 152, a tuner 153, a user operation unit 154, an output processing unit 155, a data output I/F 156, a command sending-receiving I/F 157, an antenna 121, a data cable 122b, and a command cable 123b. The control unit 152 controls an operation of each component of the STB 151. The tuner 153 extracts video/audio data of a specified channel from the cable television broadcast received by the antenna 121. The user operation unit 154 is an operation button on the body of the STB 151, and a photo detector or the like which receives an instruction signal, such as an infrared signal, from the remote control operated by the user. The output processing unit 155 processes the video/audio data, if necessary, and outputs the resultant data to the data output I/F 156. The data output I/F 156 outputs the video/audio data to the television 131 through the data cable 122b. The command sending-receiving I/F 157 sends and receives a command to and from the television 131 through the command cable 123b. The antenna 121 receives a cable television broadcast. The data cable 122b and the command cable 123b are the same as the data cable 122a and the command cable 123a, and thus their descriptions are not given here.

Note that in the television 131, the command sending-receiving I/F 140a, and the command sending-receiving I/F 140b are connected. With this structure, a command addressed to the STB 151 outputted from the DVD recorder 101 is transmitted to the STB 151 and a command addressed to the DVD recorder 101 outputted from the STB 151 is transmitted to the DVD recorder 101, respectively.

(1) Operation of DVD Recorder 101

First, an operation of the DVD recorder 101 is described.

The user can input, to the user operation unit 107, various instructions such as "start reproduction", "stop reproduction", "display menu", "close menu", and so forth. Upon receiving an instruction from the user, the user operation unit 107 outputs such instruction to the control unit 102. The control unit 102 controls an operation of each component of the DVD recorder 101 in accordance with the details of the instruction from the user operation unit 107.

<Operation when Neither Recording nor Reproduction is Carried Out>

The tuner 103 extracts the video/audio data of a specified channel from the television broadcast received by the antenna 121, and outputs it to the encoder 105 and the switch 108. The switch 108 outputs the video/audio data received from the tuner 103 to the output processing unit 112. The output processing unit 112 outputs the video/audio data received from the switch 108 to the data output I/F 109. When this is done, there is the case where the output processing unit 112 processes the video/audio data in accordance with an instruction from the control unit 102, to, for example, additionally display a reception channel number. The data output I/F 109 outputs the video/audio data received from the output processing unit 112 to the television 131 through the data cable 122a.

When switching channels, the user provides an instruction to select a channel to the user operation unit 107. Upon receiving the instruction to select the channel from the user operation unit 107, the control unit 102 indicates such channel to the tuner 103. The tuner 103 outputs, to the switch 108, the video/audio data of the channel indicated by the control unit 102. Note that a screen onto which the video/audio data received by the tuner is directly outputted, is hereinafter referred to as an EE screen.

<Menu Screen Display Operation>

The menu screen here refers to: a screen on which setting of the DVD recorder 101 is performed; a program list such as an EPG; a screen on which the contents recorded on the DVD-RAM disc 111 are listed; and the like.

Upon receiving a "display menu" instruction from the user operation unit 107, the control unit 102 instructs the output processing unit 112 to create and output a menu screen. The output processing unit 112 creates data for the menu screen instructed by the control unit 102, and outputs the resulting data for the menu screen to the data output I/F 109 in replacement of the video/audio data received from the switch 108. When this is done, there is the case where the output processing unit 112 incorporates the video/audio data received from the switch 108 into the menu screen as a portion thereof.

After that, in the case where there arises the necessity to close the menu screen such as when receiving a "close menu" instruction from the user operation unit 107, the control unit 102 instructs the output processing unit 112 to end the menu. Upon receiving the instruction to end the menu from the control unit 102, the output processing unit 112 ends the creation and output of the menu screen, and outputs the video/audio data received from the switch 108 to the data output I/F 109.

<Recording Operation>

Upon receiving an instruction to perform recording from the user operation unit 107, the control unit 102 instructs the encoder 105 and the disc management unit 104 to record the data of the television broadcast. The encoder 105 converts the video/audio data received from the tuner 103 into data suitable to be recorded onto the DVD-RAM disc 111, and outputs the resultant data to the disc management unit 104. The data suitable to be recorded is, for example, data in MPEG2-Program Stream (PS) format.

The disc management unit 104 records the data received from the encoder 105 into the DVD-RAM disc 111. When this is done, the input of the switch 108 remains the one from the tuner 103, and an EE screen is outputted from the data output I/F 109.

<Reproduction Operation>

Upon receiving an instruction to start reproduction from the user operation unit 107, the control unit 102 instructs the decoder 106 and the disc management unit 104 to reproduce the content. In addition, the control unit 102 instructs the switch 108 to switch the input to the decoder 106.

Upon receiving the instruction from the control unit 102, the switch 108 switches the input to the decoder 106. The disc management unit 104 reads the content instructed by the control unit 102 from the DVD-RAM disc 111, and outputs it to the decoder 106. The decoder 106 converts the content received from the disc management unit 104 into video/audio data, and outputs the resultant data to the switch 108. The switch 108 outputs the video/audio data received from the decoder 106 to the output processing unit 112. The output processing unit 112 outputs the video/audio data received from the switch 108 to the data output I/F 109. When this is done, there is the case where the output processing unit 112 processes the video/audio data in accordance with an instruction from the control unit 102, to, for example, additionally display the text "reproduction". The data output I/F 109 outputs the video/audio data received from the output processing unit 112 to the television 131 through the data cable 122a.

Upon receiving an instruction to stop the reproduction from the user operation unit 107, the control unit 102 instructs the decoder 106 and the disc management unit 104 to stop reproducing the content. Furthermore, the control unit 102 instructs the switch 108 to switch the input to the tuner 103.

When the reproduction of the DVD-RAM disc 111 ends, the DVD recorder 101 returns to the state in which neither recording nor reproduction is carried out, and an EE screen is outputted from the data output I/F 109.

<Command Sending Operation>

The control unit 102 instructs the command sending-receiving I/F 110 to send a start output notification command, when the data output I/F 109 starts outputting the data reproduced from the DVD-RAM disc 111 or outputting the menu screen. The command sending-receiving I/F 110 sends, through the command cable 123a, the start output notification command to an apparatus connected such as the television 131.

Furthermore, the control unit 102 instructs the command sending and receiving I/F 110 to send a start output instruction command, when the data output I/F 109 starts outputting an EE screen after ending the output of the data reproduced from the DVD-RAM disc 111 or the output of the menu screen. The command sending and receiving I/F 110 sends the start output instruction command to the STB 151 through the command cable 123a, the television 131, and the command cable 123b. Note that it is not necessary for the control unit 102 to instruct the command sending-receiving I/F 110 to send a start output instruction command in the case where the DVD recorder 101 and the STB 151 are not connected.

Upon receiving a command from an external apparatus, the command sending-receiving I/F 110 passes such command to the control unit 102. In response to this, the control unit 102 performs an operation in accordance with the details of the command received from the command sending-receiving I/F 110. For example, in the case where the command received from the command sending-receiving I/F 110 is an apparatus notification command, it is possible for the control unit 102 to know that an external apparatus such as the STB 151 is connected, by checking which apparatus has sent the command.

(2) Operation of Television 131

Next, an operation of the television 131 is described.

The user can input, to the user operation unit 138, various instructions such as "switch inputs", "select channel", "display menu", "close menu", and so forth. Upon receiving an instruction from the user, the user operation unit 138 outputs such instruction to the control unit 134. The control unit 134 controls an operation of each component of the television 131 in accordance with the details of the instruction from the user operation unit 138.

<Manual Input Switching Operation>

Upon receiving an instruction to switch the input from the user operation unit 138, the control unit 134 instructs the switch 137 to switch the input. Upon receiving, from the control unit 134, the instruction to switch the input to the data input I/F 139a while outputting the input from the tuner 136 to the output processing unit 135, the switch 137 outputs the video/audio data received from the data input I/F 139a to the output processing unit 135

<Television Broadcast Viewing Operation>

In the case of viewing a television broadcast, the input of the switch 137 is set to the tuner 136.

The tuner 136 extracts the video/audio data of a specified channel from the television broadcast received by the antenna 121, and outputs it to the switch 137. The switch 137 outputs the video/audio data received from the tuner 136 to the output processing unit 135. Of the video/audio data received from the switch 137, the output processing unit 135 outputs the video data to the screen 132 and outputs the audio data to the speaker 133. When this is done, there is the case where the output processing unit 135 processes the video data in accordance with an instruction from the control unit 134, to, for example, additionally display a reception channel number.

<External Apparatus Viewing Operation>

In the case of viewing video from an external apparatus, the input of the switch 137 is set to the data input I/F 139*a* or the data input I/F 139*b*. Here, a description is given of an operation to be performed in the case where the input of the switch 137 is set to the data input I/F 139*a*.

The data input I/F 139*a* receives video/audio data from the DVD recorder 101 through the data cable 122*a*, and outputs it to the switch 137. The switch 137 outputs the video/audio data received from the data input I/F 139*a* to the output processing unit 135.

The subsequent operations are the same as those of the television broadcast viewing operation. The operations to be performed in the case where the input of the switch 137 is set to the data input I/F 139*b* are also the same.

<Menu Screen Display Operation>

The menu screen here refers to: a screen on which setting of the television 131 is performed; a program list such as an EPG; a screen on which a connected apparatus is operated; and the like.

Upon receiving a "display menu" instruction from the user operation unit 138, the control unit 134 instructs the output processing unit 135 to create and output a menu screen. The output processing unit 135 creates data for the menu screen instructed by the control unit 134, and displays the resulting data onto the screen 132. In addition, the output processing unit 135 outputs the audio data to the speaker 133 if necessary. When this is done, there is the case where the output processing unit 135 incorporates the video/audio data received from the switch 137 into the menu screen as a portion thereof.

After that, in the case where there arises the necessity to close the menu screen such as when receiving a "close menu" instruction from the user operation unit 138, the control unit 134 instructs the output processing unit 135 to end the menu. Upon receiving the instruction to end the menu from the control unit 134, the output processing unit 135 ends the creation and output of the menu screen, and outputs the video/audio data received from the switch 137 to the screen 132 and the speaker 133.

<Automatic Input Switching Operation>

Upon receiving a command from an external apparatus (in FIG. 2, the DVD recorder 101 or the STB 151) through the command cable 123*a* or 123*b*, the command sending-receiving I/Fs 140*a* or 140*b* outputs such command to the control unit 134. In the case where the command received by the command sending-receiving I/Fs 140*a* or 140*b* is a start output notification command, the control unit 134 instructs the switch 137 to switch the input to an input from the data input I/Fs 139*a* to 139*b* to which the apparatus that has sent such start output notification command is connected. For example, in the case where the apparatus that has sent the start output notification command is the DVD recorder 101, the input of the switch 137 will be switched to the data input I/F 139*a*.

(3) Operation of STB 151

Next, an operation of the STB 151 is described.

The user can input, to the user operation unit 154, various instructions such as "select channel" and so forth. Upon receiving an instruction from the user, the user operation unit 154 outputs such instruction to the control unit 152. The control unit 152 controls an operation of each component of the STB 151 in accordance with the details of the instruction from the user operation unit 154.

<Television Broadcast Viewing Operation>

The tuner 153 extracts the video/audio data of a specified channel from the cable television broadcast received by the antenna 121, and outputs it to the output processing unit 155. The output processing unit 155 outputs the video/audio received from the tuner 153 to the data output I/F 156. The data output I/F 156 outputs the video/audio data received from the output processing unit 155 to the television 131 through the data cable 122*b*.

<Command Sending/Receiving Operation>

The control unit 152 instructs the command sending-receiving I/F 157 to send an apparatus notification command, where necessary. The command sending-receiving I/F 157 sends an apparatus notification command to an external apparatus through the command cable 123*b*. The timing for sending the apparatus notification command is, for example, when the STB 151 and the television 131 are connected, when the STB 151 is powered on, and the like.

Upon receiving a start output instruction command from the external apparatus, the command sending-receiving I/F 157 passes such start output instruction command to the control unit 152. Upon receiving the start output instruction command from the command sending-receiving I/F 157, the control unit 152 instructs the command sending-receiving I/F 157 to send a start output notification command. The command sending-receiving I/F 157 sends, through the command cable 123*b*, the start output notification command to an apparatus connected such as the television 131.

(4) Operations of DVD Recorder 101, Television 131, and STB 151

Figure 3:
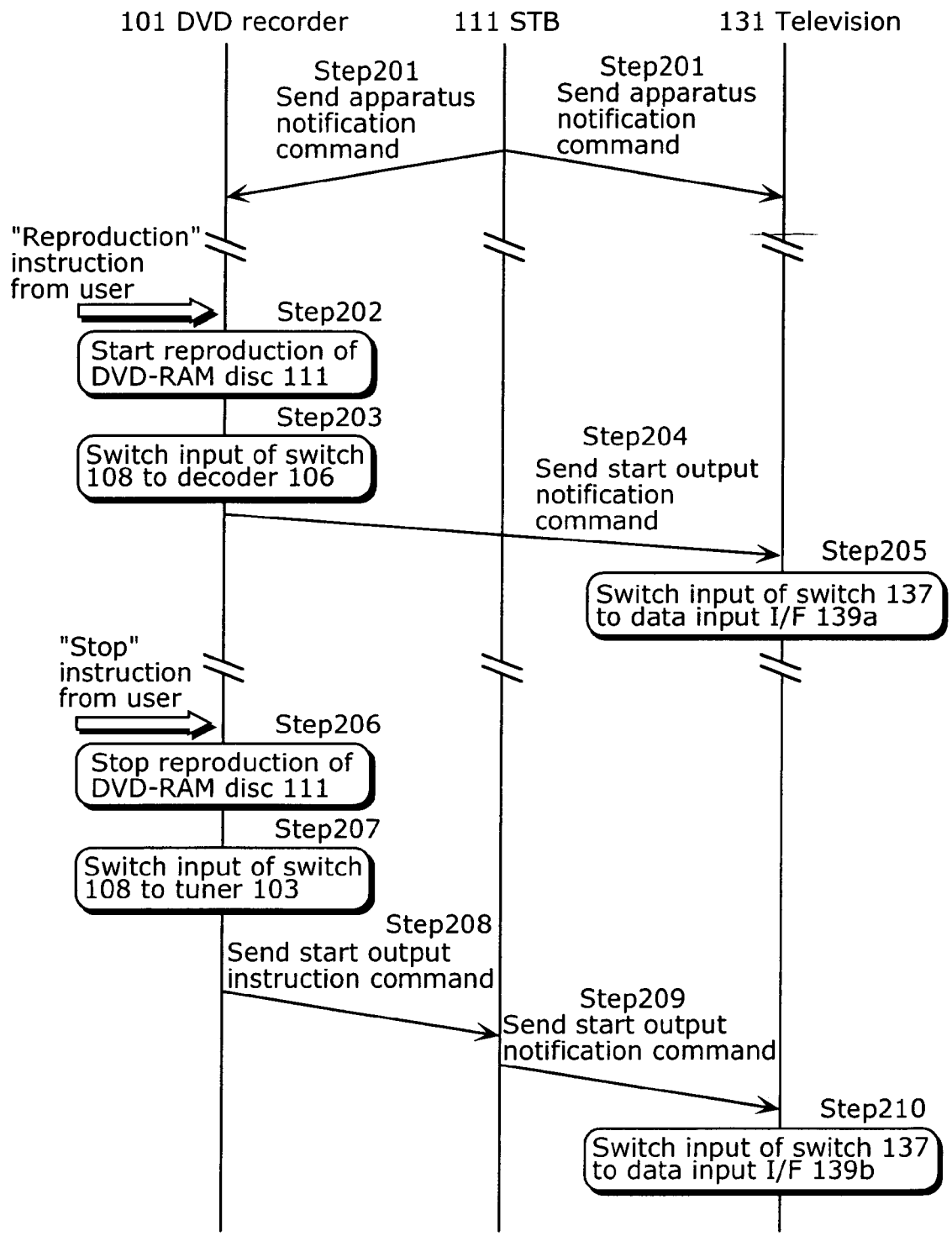
FIG. 3 is a flowchart of the first embodiment.

FIG. 3 is a flowchart which shows operations of the DVD recorder 101, the STB 151, and the television 131. The following describes operations performed by each apparatus when the reproduction by the DVD recorder 101 starts/stops. Here, it is assumed that the input of the television 131 is set to the data input unit 139*b*, and that the user is viewing the cable television broadcast received by the STB 151.

The STB 151 sends an apparatus notification command to the DVD recorder 101 and the television 131 beforehand (Step 201). Through this, the DVD recorder 101 knows that it is connected to the STB 151.

Upon receiving a "start reproduction" instruction from the user, the DVD recorder 101 starts the reproduction of the DVD-RAM disc 111 (Step 202), and switches the input of the switch 108 to the decoder 106 (Step 203). At the same time, the DVD recorder 101 sends a start output notification command to the television 131 (Step 204).

Upon receiving the start output notification command, the television 131 switches the input of the switch 137 to the data input I/F 139*a* (Step 205). In this case, it is possible to view the video/audio reproduced from the DVD-RAM disc 111 outputted from the DVD recorder 101.

After that, upon receiving the "stop reproduction" instruction from the user, the DVD recorder 101 stops the reproduction of the DVD-RAM disc 111 (Step 206), and switches the input of the switch 108 to the tuner 103 (Step 207). At the same time, the DVD recorder 101 sends a start output instruction command to the STB 151 (Step 208).

Upon receiving the start output instruction command, the STB 151 sends a start output notification command to the television 131 (Step 209). Upon receiving the start output notification command from the STB 151, the television 131 checks which apparatus has sent such start output notification command. Then, after confirming that the apparatus which has sent the command is the STB 151, the television 131 switches the input of the switch 137 to the data input I/F 139*b* to which this STB 151 is connected (Step 210). In this case, it is possible to view the cable television broadcast received by the STB 151 again.

Figure 4:
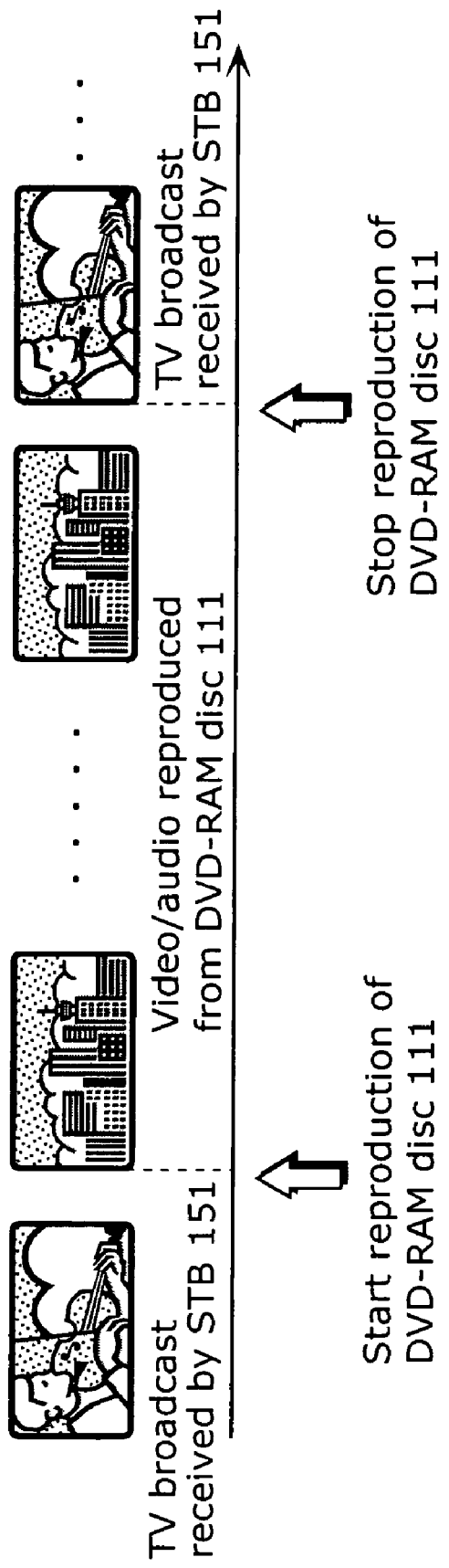
FIG. 4 is a diagram which shows the transition of screens displayed on a television in the first embodiment.

FIG. 4 is a diagram which shows the transition of screens displayed on the television 131.

To be more specific, when the reproduction by the DVD recorder 101 starts while the cable television broadcast received by the STB 151 is viewed, the input of the television 131 automatically switches to the DVD recorder 101, and the video reproduced from the DVD-RAM disc 111 is to be displayed (Step 203). When the reproduction by the DVD recorder 101 stops, the input of the television 131 automatically switches to the STB 151, and the cable television broadcast received by the STB 151 is to be displayed (Step 210).

Operations to be performed by each apparatus when the display of the menu screen of the DVD recorder 101 starts and ends are the same as those shown in the flowchart of FIG. 3. In other words, the DVD recorder 101 sends, to the STB 151, a start output notification command at the time of starting the menu screen display and a start output instruction command at the time of ending the menu screen display.

Figure 5:
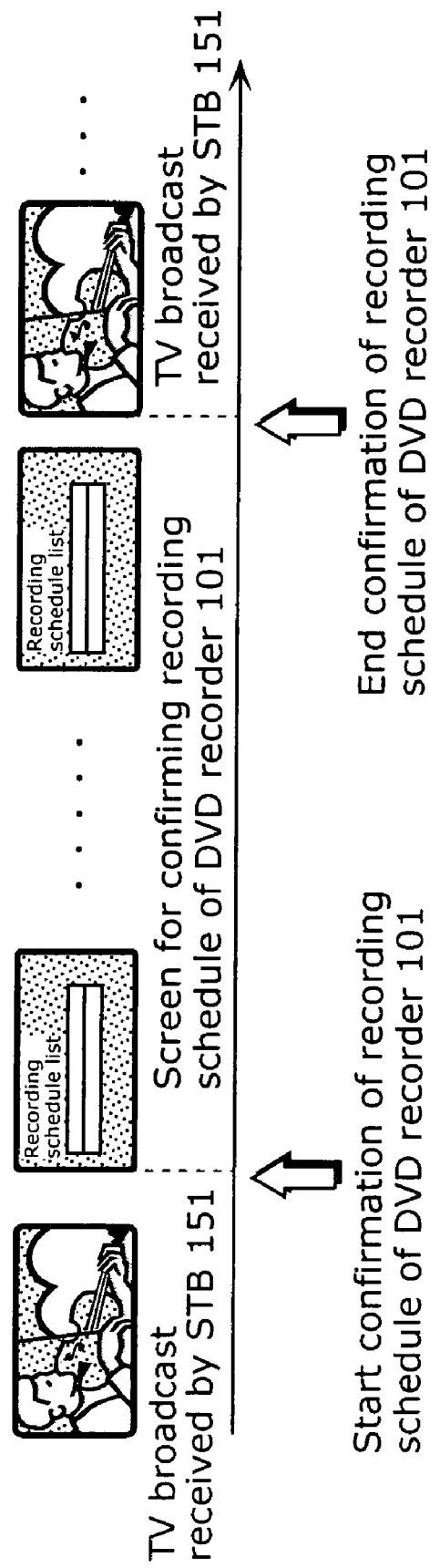
FIG. 5 is a diagram which shows the transition of screens displayed on the television in the first embodiment.

FIG. 5 is a diagram which shows the transition of screens displayed on the television 131.

To be more specific, when the menu display of the DVD recorder 101 starts while the cable television broadcast received by the STB 151 is viewed, the input of the television 131 automatically switches to the DVD recorder 101, and the menu screen of the DVD recorder 101 is to be displayed, as in the case of FIG. 4. Meanwhile, when the menu display of the DVD recorder 101 ends, the input of the television 131 automatically switches to the STB 151, and the cable television broadcast received by the STB 151 is to be displayed.

As described above, according to the first embodiment, it is possible to automatically switch the input of the television 131 to the cable television broadcast received by the STB 151 when the output of the DVD recorder 101 returns to the EE screen. This eliminates the necessity to perform a complicated operation of switching the input of the television, and thus results in improved usability.

Note that the order of Step 202, Step 203, and Step 204 in the flowchart of FIG. 3 may be interchanged, or these may be performed at the same time. Similarly, the order of Step 206, Step 207, and Step 208 may be interchanged, or these may be performed at the same time.

Furthermore, the DVD recorder 101 may include an external input I/F for establishing a connection with an external apparatus, such that video/audio data outputted from the external apparatus and a television broadcast received by the tuner 103 can be switched therebetween.

Furthermore, a recording medium recorded and reproduced by the DVD recorder 101 is not limited to a DVD-RAM disc, and thus it may be another removable medium such as a DVD-R disc, or may be a fixed medium such as a hard disk. The DVD recorder may be a recording/reproduction apparatus capable of performing recording and reproduction of one or more types of recording media. The DVD recorder may not include the encoder, and a reproduction-only apparatus such as a DVD player that performs only the reproduction of a recording medium such as a DVD-RAM, may be adopted in replacement of the DVD recorder.

Figure 6:
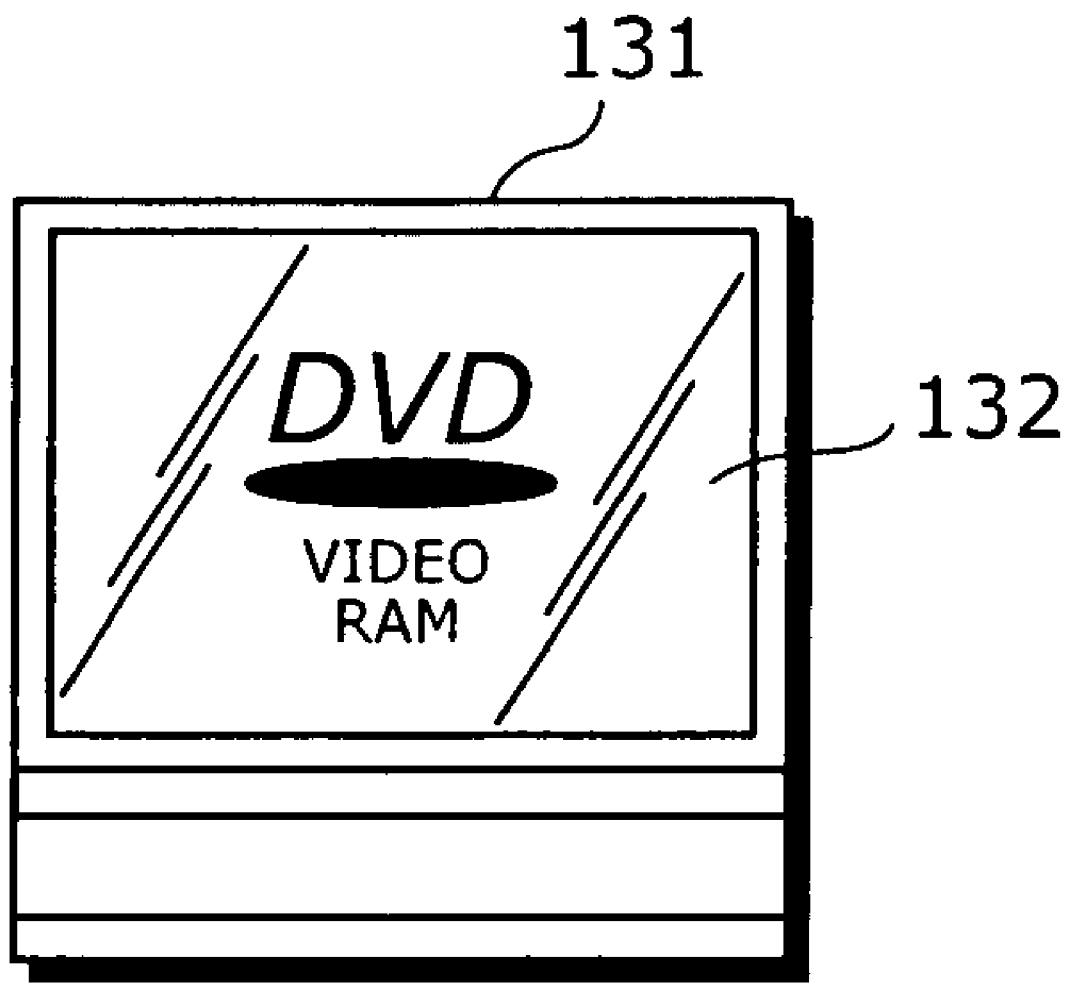
FIG. 6 is a diagram which shows an example of a predetermined screen.

Moreover, the DVD recorder 101 may not include the tuner. In this case, a predetermined screen as shown in FIG. 6 is set to be outputted when the reproduction of the DVD-RAM disc is not carried out, and a start output instruction command is set to be outputted to the STB 151 when the screen returns to such predetermined screen.

In the above description, although the television 131 includes two data input I/Fs, it may include three or more data input I/Fs. These data input I/Fs may be of the same type or of different types. Furthermore, the number of apparatuses that can be connected to the data input I/Fs at the same time may be either one or more. In other words, it is acceptable as long as it is possible to identify the apparatus which has sent the command received by the command sending-receiving I/Fs 140a or 140b and to switch the input of the television 131 to such apparatus having sent the command.

In addition, although the structure in which the television 131 includes the tuner 136 has been shown as an example, the present invention is not limited to this. In other words, the television 131 may be a monitor that only displays video inputted from an external apparatus.

In addition, the types of television broadcasts that the DVD recorder 101, the television 131 and the STB 151 can receive may be of the same type or of different types.

Moreover, the number of cables making up the respective data cables and command cables may be either one or more, or a bundle of plural signal wires may serve as a single cable. In addition, a structure may be adopted in which data is transmitted as a wireless signal such as an infrared signal, rather than by using cable.

Second Embodiment

In the above-described first embodiment, a start output instruction command is sent to the STB at a predetermined timing at all times, but there exist STBs from various manufacturers. Thus, since there may be the case where some STBs cannot recognize a start output instruction command, the second embodiment adopts a structure in which a start output instruction command is sent only in the case where the manufacturer of an STB connected to the DVD recorder is a predetermined manufacturer. The following describes the second embodiment by focusing on the differences from the first embodiment.

Figure 7:
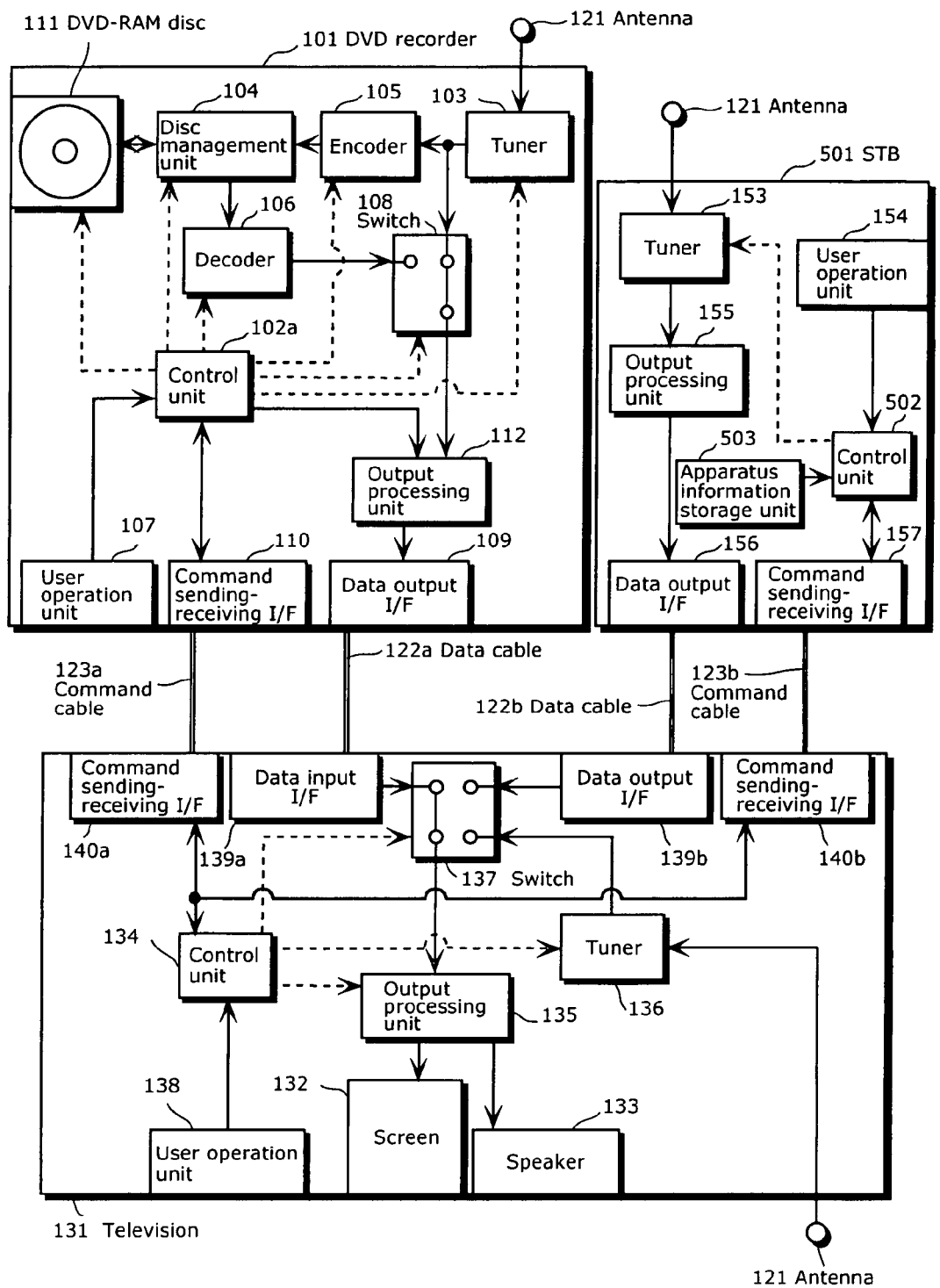
FIG. 7 is a diagram which shows an example structure of a second embodiment.

FIG. 7 is a diagram which shows an example structure of the second embodiment. The difference from the first embodiment is that the STB 501 includes an apparatus information storage unit 503. Moreover, the function of the control unit 502 of the STB 501 and the function of the control unit 102a of the DVD recorder 101 are different from those of the first embodiment. The other components have the same functions as those of the first embodiment, and thus they will be described using the same reference numbers.

The apparatus information storage unit 503 of the STB 501 stores inside it manufacturer information of such STB 501. The control unit 502 outputs, to the command I/F 157, a manufacturer notification command that includes the manufacturer information stored in the apparatus information storage unit 503. The timing for sending the manufacturer notification command is, for example, when the STB 501 and the television 131 are connected, when the STB 501 is powered on, and the like.

Figures 8A, 8B:
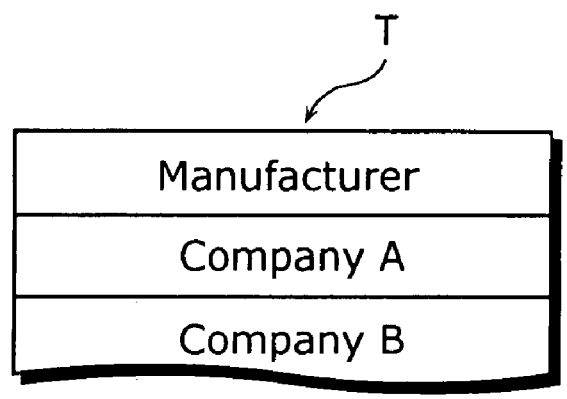
FIG. 8A and FIG. 8B are diagrams, each showing an example of a listing of manufacturers.

The control unit 102a of the DVD recorder 101 instructs the command sending-receiving I/F 110 to send a start output instruction command, only in the case where the manufacturer of the STB 501 is a predetermined manufacturer. In order to determine whether the manufacturer of the STB 501 is a predetermined manufacturer as described above, the control unit 102a holds inside it a listing of manufacturers. FIG. 8A is a diagram which shows an example listing of manufacturers held by the control unit 102a. Here, it is assumed that STBs 501 whose manufacturers are Company A and Company B are capable of recognizing a start output instruction command.

Figure 9:
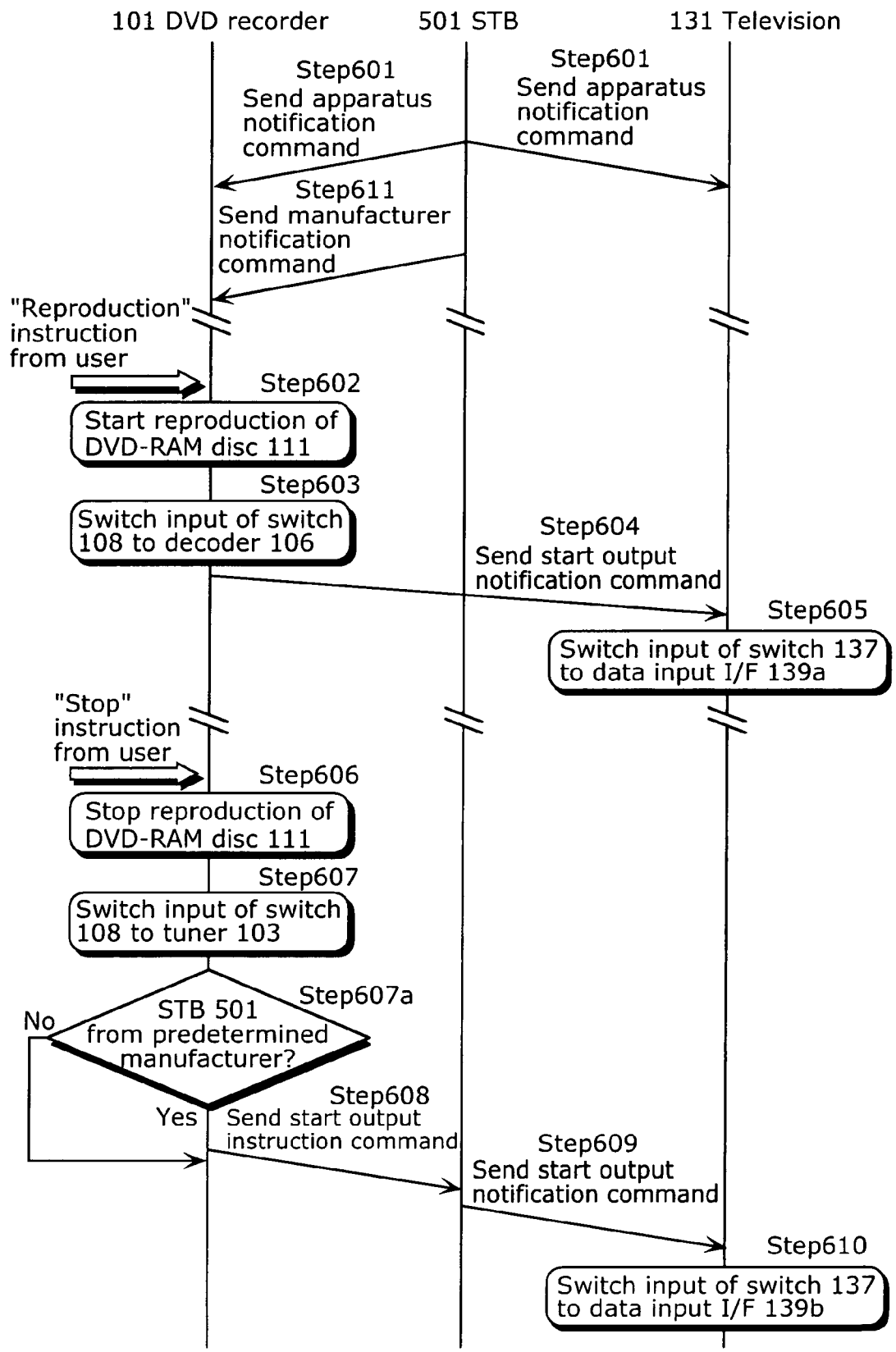
FIG. 9 is a flowchart of the second embodiment.

FIG. 9 is a flowchart which shows an operation of each apparatus in the second embodiment. The following describes an operation performed by each apparatus when the reproduction by the DVD recorder 101 starts/stops. Here, it is also assumed that the input of the television 131 is set to the data input I/F 139b, and that the user is viewing the cable television broadcast received by the STB 501.

The STB 501 sends an apparatus notification command to the DVD recorder 101 and the television 131 beforehand (Step 601). Through this, the DVD recorder 101 knows that it is connected to the STB 501.

In addition, the STB 501 sends a manufacturer notification command to the DVD recorder 101 beforehand (Step 611). Through this, the DVD recorder 101 knows the manufacturer of the STB 501.

Upon receiving a "start reproduction" instruction from the user, the DVD recorder 101 starts the reproduction of the DVD-RAM disc 111 (Step 602), and switches the input of the switch 108 to the decoder 106 (Step 603). At the same time, the DVD recorder 101 sends a start output notification command to the television 131 (Step 604).

Upon receiving the start output notification command, the television 131 switches the input of the switch 137 to the data input I/F 139a (Step 605). In this case, it is possible to view the video/audio reproduced from the DVD-RAM disc 111 outputted from the DVD recorder 101.

After that, upon receiving the "stop reproduction" instruction from the user, the DVD recorder 101 stops the reproduction of the DVD-RAM disc 111 (Step 606), and switches the input of the switch 108 to the tuner 103 (Step 607). At the same time, in the case where the manufacturer of the STB 501 is a predetermined manufacturer (Yes in Step 607a), the DVD recorder 101 sends a start output instruction command to the STB 501 (Step 608). For example, in the case where the manufacturer information included in the manufacturer notification command is Company A, Company B, or the like, the DVD recorder 101 sends a start output instruction command to the STB 501.

Upon receiving the start output instruction command, the STB 501 sends a start output notification command to the television 131 (Step 609). Upon receiving the start output notification command from the STB 501, the television 131 checks which apparatus has sent such start output notification command. Then, after confirming that the apparatus which has sent the command is the STB 501, the television 131 switches the input of the switch 137 to the data input I/F 139b to which this STB 501 is connected (Step 610). In this case, it is possible to view the cable television broadcast received by the STB 501 again.

Through the above operations, the transition of screens displayed on the television 131 will be the one as shown in FIG. 4 as in the case of the first embodiment. Furthermore, since the operation performed by each apparatus when the display of the menu screen of the DVD recorder 101 starts/ends is the same as the one shown in the flowchart of FIG. 9, the transition of screens displayed on the television 131 in such case will be the one as shown in FIG. 5 as in the case of the first embodiment.

As described above, according to the second embodiment, it is possible to automatically switch the input of the television 131 to a cable television broadcast received by the STB 501 when the output of the DVD recorder 101 returns to the EE screen, only in the case where the manufacturer of the STB 501 is a predetermined manufacturer. This makes it possible to prevent the occurrence of defects that are caused by the difference in manufacturers.

Note that in the above description, although it is determined whether the manufacturer of the STB 501 is a predetermined manufacturer, the present invention is not limited to this. In other words, it is usual that STBs from the same manufacture are different in function depending on their model and version. FIG. 8B is a diagram which shows another example listing of manufacturers held by the control unit 102a. As shown in this diagram, it may be determined whether the STB is of a predetermined model and further whether its version is a predetermined version, in addition to determining whether the manufacturer is a predetermined manufacturer. In this case, it is of course necessary for a manufacturer notification command to include model information and version information.

Note that the order of Step 602, Step 603, and Step 604 in the flowchart of FIG. 9 may be interchanged, or these may be performed at the same time. Similarly, the order of Step 606, Step 607, and Step 608 may be interchanged, or these may be performed at the same time.

Furthermore, the DVD recorder 101 may include an external input I/F for establishing a connection with an external apparatus, such that video/audio data outputted from the external apparatus and a television broadcast received by the tuner 103 can be switched therebetween.

Furthermore, a recording medium recorded and reproduced by the DVD recorder 101 is not limited to a DVD-RAM disc, and thus it may be another removable medium such as a DVD-R disc, or may be a fixed medium such as a hard disk. The DVD recorder may be a recording/reproduction apparatus capable of performing recording and reproduction of one or more types of recording media. The DVD recorder may not include the encoder, and a reproduction-only apparatus such as a DVD player that performs only the reproduction of a recording medium such as a DVD-RAM, may be adopted in replacement of the DVD recorder.

Furthermore, the DVD recorder 101 may not include the tuner. In this case, a predetermined screen as shown in FIG. 6 is set to be outputted when the reproduction of the DVD-RAM disc is not carried out, and a start output instruction command is set to be outputted to the STB 501 when the screen returns to such predetermined screen.

In the above description, although the television 131 includes two data input I/Fs, it may include three or more data input I/Fs. These data input I/Fs may be of the same type or of different types. Furthermore, the number of apparatuses that can be connected to the data input I/Fs at the same time may be either one or more. In other words, it is acceptable as long as it is possible to identify the apparatus which has sent the command received by the command sending-receiving I/Fs 140a or 140b and to switch the input of the television 131 to such apparatus having sent the command.

In addition, although the structure in which the television 131 includes the tuner 136 has been shown as an example, the present invention is not limited to this. In other words, the television 131 may be a monitor that only displays video inputted from an external apparatus.

In addition, the types of television broadcasts that the DVD recorder 101, the television 131 and the STB 501 can receive may be of the same type or of different types.

Moreover, the number of cables making up the respective data cables and command cables may be either one or more, or a bundle of plural signal wires may serve as a single cable. In addition, a structure may be adopted in which data is transmitted as a wireless signal such as an infrared signal, rather than by using cable.

Third Embodiment

The first embodiment has described the case where the television 131 includes two data input I/Fs, but the present invention is not limited to this. To be more specific, even in the case where the television 131 includes only one data input I/F, it is possible to achieve the same effect as that of the first embodiment by using a switching apparatus described below.

Figure 10:
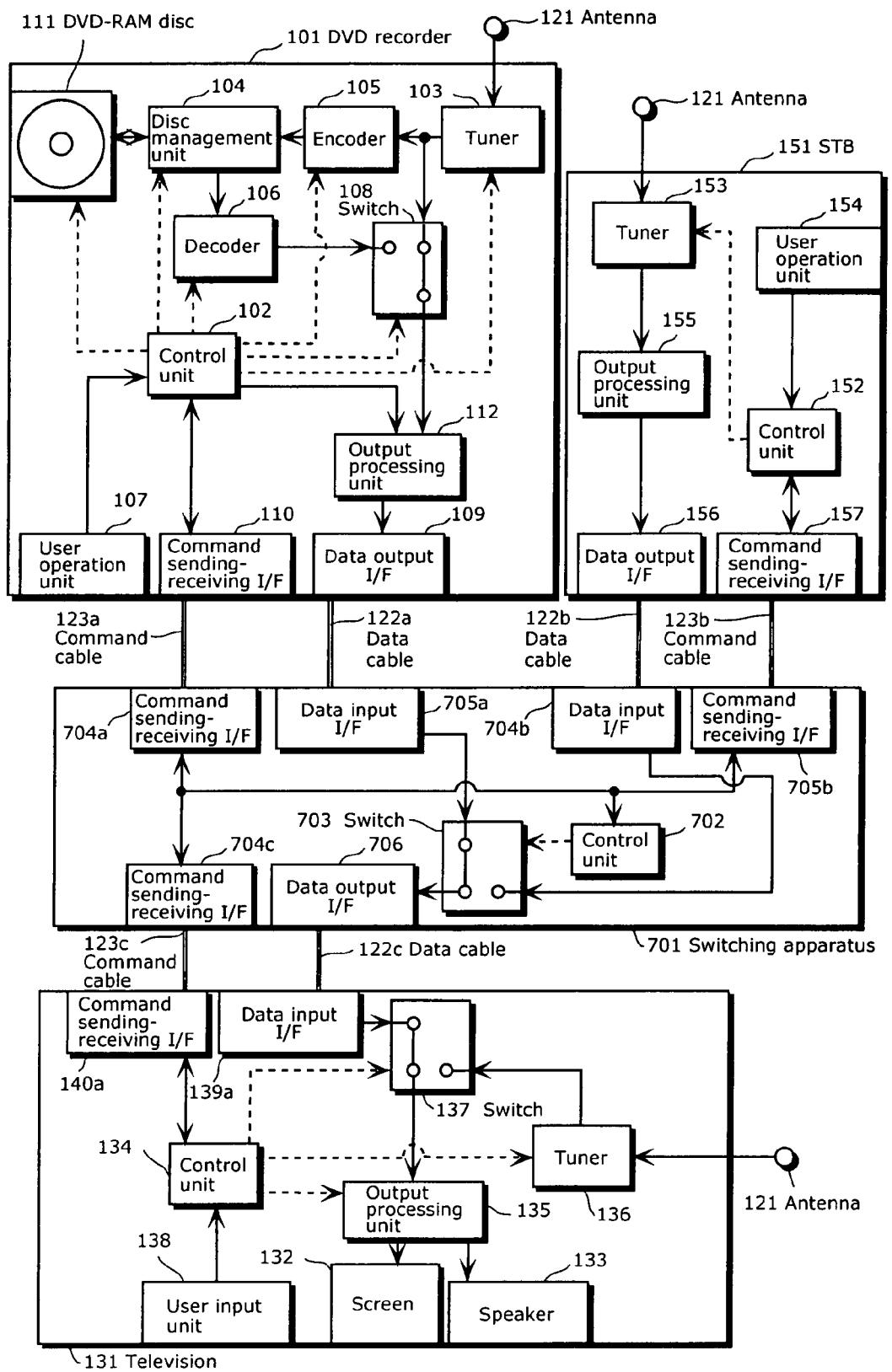
FIG. 10 is a diagram which shows an example structure of a third embodiment.

FIG. 10 is a diagram which shows an example structure of the third embodiment. The same reference numbers are assigned to the components having the same functions as those in FIG. 2. Here, a structure is adopted in which the DVD recorder 101 and the STB 151 are connected to a switching apparatus 701, rather than directly connecting the DVD recorder 101 and the STB 151 to different input terminals of the television 131, and in which the output of this switching apparatus 701 is inputted to the television 131.

The switching apparatus 701 includes a control unit 702, a switch 703, a command sending-receiving I/Fs 704*a*, 704*b* and 704*c*, and a data input I/Fs 705*a*, 705*b*, and 706. This switching apparatus 701 has a structure in which the command sending-receiving I/F 704*a*, the command sending-receiving I/F 704*b*, and the command sending-receiving I/F 704*c* are connected with one another, such that all commands received from a certain apparatus are transmitted to correct addresses of apparatuses.

(1) Switching Apparatus 701

First, an operation of the switching apparatus 701 is described.

The data input I/F 705*a* and the data input I/F 705*b* output video/audio data received through the data cables 122*a* and 122*b* to the switch 703. The command sending-receiving I/F 704*a*, the command sending-receiving I/F 704*b* and the command sending-receiving I/F 704*c* pass a command received through the command cables 123*a* to *c* to the control unit 702.

In the case where the received command is a start output notification command, the control unit 702 switches the input of the switch 703 to an output from the apparatus that has sent the start output notification command. For example, in the case where the apparatus that has sent the start output notification command is the DVD recorder 101, the control unit 702 switches the input of the switch 703 to the command sending-receiving I/F 704*a*.

The switch 703 outputs the video/audio data inputted thereto to the data output I/F 706. The data output I/F 706 outputs the video/audio data received from the switch 703 to the television 131 through the data cable 122*c*.

(2) Operations of DVD Recorder 101, STB 151, Switching Apparatus 701, and Television 131.

Figure 11:
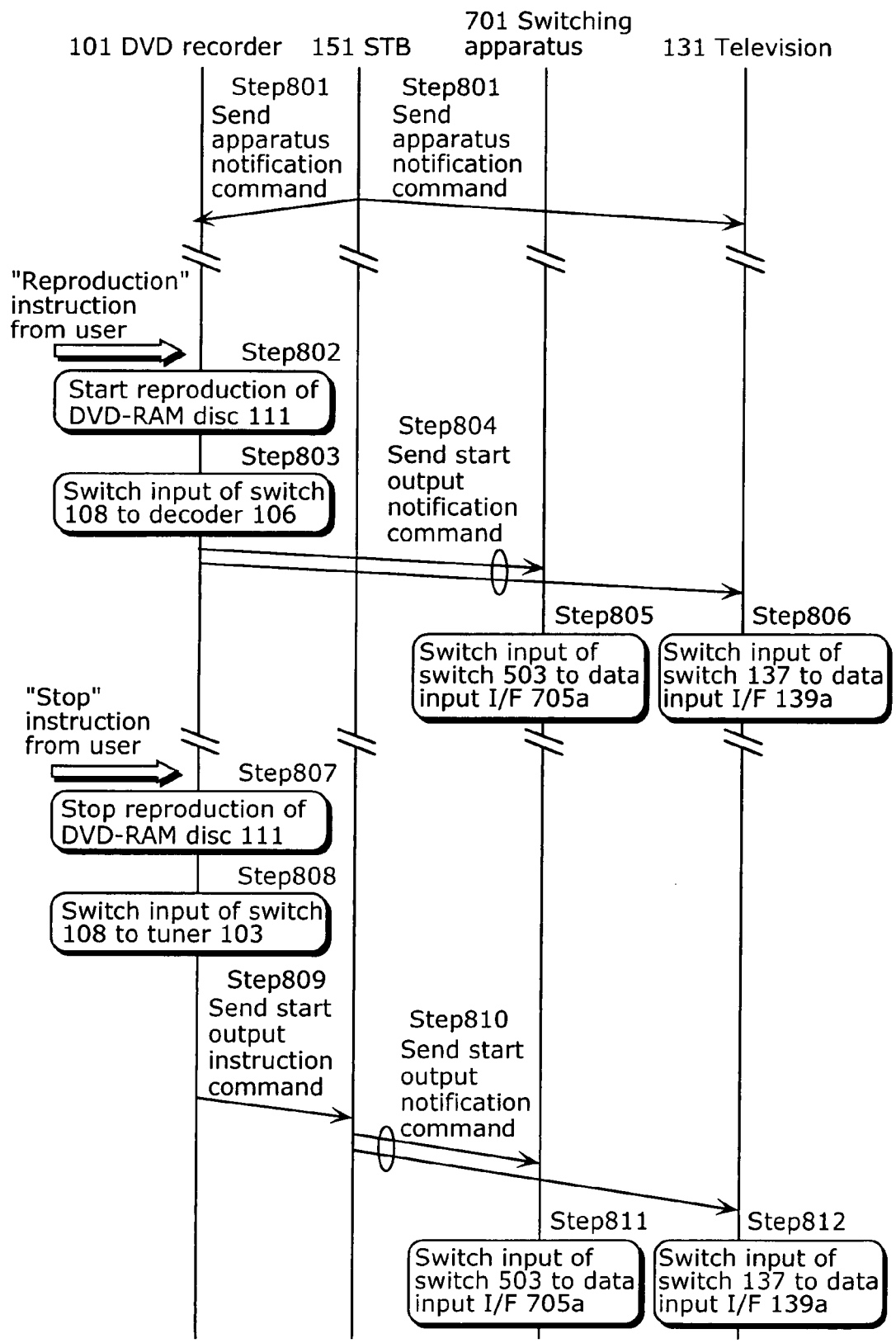
FIG. 11 is a flowchart of the third embodiment.

FIG. 11 is a flowchart which shows operations of the DVD recorder 101, the STB 151, the switching apparatus 701, and the television 131. The following describes an operation performed by each apparatus when the reproduction by the DVD recorder 101 starts/stops. Here, it is assumed that the input of the switching apparatus 701 is set to the data input I/F 705*b*, and that the user is viewing a cable television broadcast received by the STB 151.

The STB 151 sends an apparatus notification command to the DVD recorder 101, the switching apparatus 701, and the television 131 beforehand (Step 801). Through this, the DVD recorder 101 knows that it is connected to the STB 151.

Upon receiving a "start reproduction" instruction from the user, the DVD recorder 101 starts the reproduction of the DVD-RAM disc 111 (Step 802), and switches the input of the switch 108 to the decoder 106 (Step 803). At the same time, the DVD recorder 101 sends a start output notification command to the television 131 and the switching apparatus 701 (Step 804).

Upon receiving the start output notification command from the DVD recorder 101, the switching apparatus 701 switches the input of the switch 703 to the data input I/F 704*a* (Step 805). At this time, the video/audio data outputted from the DVD recorder 101 is to be outputted to the television 131.

Upon receiving the start output notification command from the DVD recorder 101, the television 131 switches the input of the switch 137 to the data input I/F 139*a* (Step 806). In this case, it is possible to view the video/audio reproduced from the DVD-RAM disc 111 outputted from the DVD recorder 101.

After that, upon receiving the "stop reproduction" instruction from the user, the DVD recorder 101 stops the reproduction of the DVD-RAM disc 111 (Step 807), and switches the input of the switch 108 to the tuner 103 (Step 808). At the same time, the DVD recorder 101 sends a start output instruction command to the STB 151 (Step 809).

Upon receiving the start output instruction command, the STB 151 sends a start output notification command to the television 131 and the switching apparatus 701 (Step 810). Upon receiving the start output notification command from the STB 151, the switching apparatus 701 switches the input of the switch 703 to the data input I/F 704*b* (Step 811). At this time, the video/audio data outputted from the STB 151 is to be outputted to the television 131.

Upon receiving the start output notification command from the STB 151, the television 131 checks which apparatus has sent such start output notification command. Then, after confirming that the apparatus which has sent the command is the STB 151, the television 131 switches the input of the switch 137 to the data input I/F 139*a* to which this STB 151 is connected (Step 812). In this case, it is possible to view the cable television broadcast received by the STB 151 again. Meanwhile, no switching is performed in Step 812, since the input of the switch 137 is the data input I/F 139*a* from the beginning.

Through the above operations, the transition of screens displayed on the television 131 will be the one as shown in FIG. 4 as in the case of the first embodiment. Furthermore, since the operation performed by each apparatus when the display of the menu screen of the DVD recorder 101 starts/ends is the same as the one shown in the flowchart of FIG. 11, the transition of screens displayed on the television 131 in such case will be the one as shown in FIG. 5 as in the case of the first embodiment.

As described above, according to the third embodiment, it is possible to automatically switch the input of the television 131 to a cable television broadcast received by the STB 151 when the output of the DVD recorder 101 returns to the EE screen, even in the case where the television 131 includes only one data input I/F.

Note that the order of Step 802, Step 803 and Step 804 in the flowchart of FIG. 11 may be interchanged, or these may be performed at the same time. Similarly, the order of Step 807, Step 808 and Step 809 may be interchanged, or these may be performed at the same time.

Furthermore, the DVD recorder 101 may include an external input I/F for establishing a connection with an external apparatus, such that video/audio data outputted from the external apparatus and a television broadcast received by the tuner 103 can be switched therebetween.

Furthermore, a recording medium recorded and reproduced by the DVD recorder 101 is not limited to a DVD-RAM disc, and thus it may be another removable medium such as a DVD-R disc, or may be a fixed medium such as a hard disk. The DVD recorder may be a recording/reproduction apparatus capable of performing recording and reproduction of one or more types of recording media. The DVD recorder may not include the encoder, and a reproduction-only apparatus such as a DVD player that performs only the reproduction of a recording medium such as a DVD-RAM, may be adopted in replacement of the DVD recorder.

Furthermore, the DVD recorder 101 may not include the tuner. In this case, a predetermined screen as shown in FIG. 6 is set to be outputted when the reproduction of the DVD-RAM disc is not carried out, and a start output instruction command is set to be outputted to the STB 151 when the screen returns to such predetermined screen.

In the above description, although the television 131 includes only one data input I/F, it may include two or more data input I/Fs. These data input I/Fs may be of the same type or of different types. Furthermore, the number of apparatuses that can be connected to the data input I/Fs at the same time may be either one or more. In other words, it is acceptable as long as it is possible to identify the apparatus which has sent the command received by the command sending-receiving I/F 140a and to switch the input of the television 131 to such apparatus having sent the command.

In the above description, although the switching apparatus 701 includes two data input I/Fs, it may include three or more data input I/Fs. These data input I/Fs may be of the same type or of different types. In other words, it is acceptable as long as it is possible to identify the apparatus which has sent the command received by the command sending-receiving I/F and to switch the input of the switching apparatus 701 to such apparatus having sent the command.

In addition, although the structure in which the television 131 includes the tuner 136 has been shown as an example, the present invention is not limited to this. In other words, the television 131 may be a monitor that only displays video inputted from an external apparatus.

In addition, the types of television broadcasts that the DVD recorder 101, the television 131 and the STB 151 can receive may be of the same type or of different types.

In addition, information for identifying an apparatus that is to start output may be included in a start output instruction command, and the DVD recorder 101 may send such start output instruction command to an external apparatus such as the switching apparatus 701. In such case, upon receiving the start output instruction command, the switching apparatus 701 may switch the output from the switching apparatus 701 to the video/audio data from the apparatus that is to start output, the apparatus being indicated in the start output instruction command.

Moreover, the number of cables making up the respective data cables and command cables may be either one or more, or a bundle of plural signal wires may serve as a single cable. In addition, a structure may be adopted in which data is transmitted as a wireless signal such as an infrared signal, rather than by using cable.

Fourth Embodiment

In the above-described third embodiment, a start output instruction command is sent to the STB at a predetermined timing at all times, but there exist STBs from various manufacturers. Thus, since there may be the case where some STBs cannot recognize a start output instruction command, the fourth embodiment adopts a structure in which a start output instruction command is sent only in the case where the manufacturer of an STB connected to the DVD recorder is a predetermined manufacturer. The following describes the fourth embodiment by focusing on the differences from the third embodiment.

Figure 12:
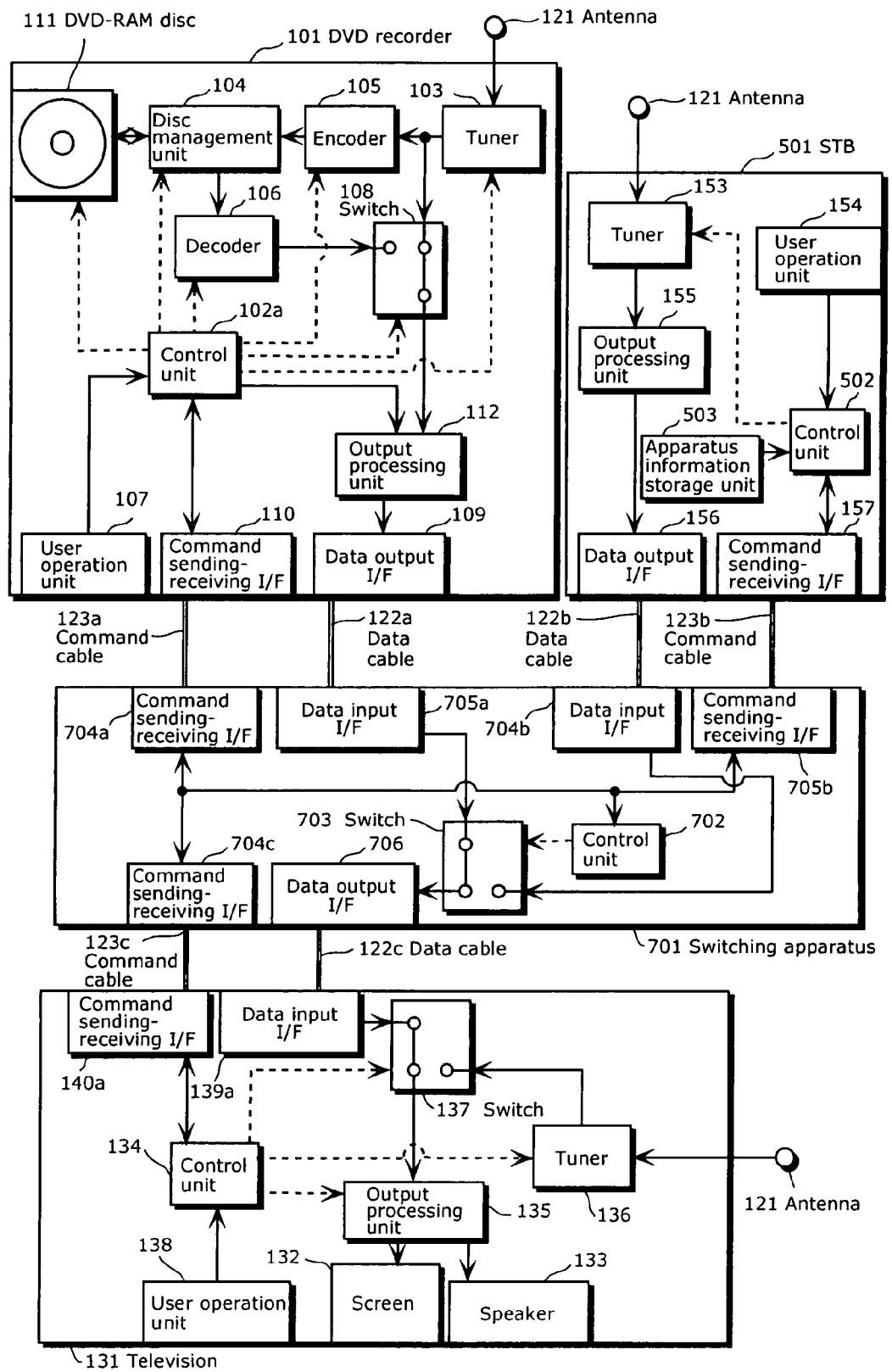
FIG. 12 is a diagram which shows an example structure of a fourth embodiment.

FIG. 12 is a diagram which shows an example structure of the fourth embodiment. The difference from the third embodiment is that the STB 501 includes an apparatus information storage unit 503. Moreover, the function of the control unit 502 of the STB 501 and the function of the control unit 102a of the DVD recorder 101 are different from those of the third embodiment. These points are as described in the second embodiment, and thus their detailed descriptions will not be given.

FIG. 13 is a flowchart which shows an operation of each apparatus in the fourth embodiment. The following describes an operation performed by each apparatus when the reproduction by the DVD recorder 101 starts/stops. Here, it is assumed that the input of the switching apparatus 701 is set to the data input I/F 705b, and that the user is viewing the cable television broadcast received by the STB 501.

The STB 501 sends an apparatus notification command to the DVD recorder 101 and the television 131 beforehand (Step 1001). Through this, the DVD recorder 101 knows that it is connected to the STB 501.

In addition, the STB 501 sends a manufacturer notification command to the DVD recorder 101 beforehand (Step 1013). Through this, the DVD recorder 101 knows the manufacturer of the STB 501.

Upon receiving a "start reproduction" instruction from the user, the DVD recorder 101 starts the reproduction of the DVD-RAM disc 111 (Step 1002), and switches the input of the switch 108 to the decoder 106 (Step 1003). At the same time, the DVD recorder 101 sends a start output notification command to the television 131 and the switching apparatus 701 (Step 1004).

Upon receiving the start output notification command from the DVD recorder 101, the switching apparatus 701 switches the input of the switch 703 to the data input I/F 704a (Step 1005). At this time, the video/audio data outputted from the DVD recorder 101 is to be outputted to the television 131.

Upon receiving the start output notification command from the DVD recorder 101, the television 131 switches the input of the switch 137 to the data input I/F 139a (Step 1006). In this case, it is possible to view the video/audio reproduced from the DVD-RAM disc 111 outputted from the DVD recorder 101.

After that, upon receiving the "stop reproduction" instruction from the user, the DVD recorder 101 stops the reproduction of the DVD-RAM disc 111 (Step 1007), and switches the input of the switch 108 to the tuner 103 (Step 1008). At the same time, in the case where the manufacturer of the STB 501 is a predetermined manufacturer (Yes in Step 1008a), the DVD recorder 101 sends a start output instruction command to the STB 501 (Step 1009).

Upon receiving the start output instruction command, the STB 501 sends a start output notification command to the television 131 and the switching apparatus 701 (Step 1010). Upon receiving the start output notification command from the STB 501, the switching apparatus 701 switches the input of the switch 703 to the data input I/F 704b (Step 1011). At this time, the video/audio data outputted from the STB 501 is to be outputted to the television 131.

Upon receiving the start output notification command from the STB 501, the television 131 checks which apparatus has sent such start output notification command. Then, after confirming that the apparatus which has sent the command is the STB 501, the television 131 switches the input of the switch 137 to the data input I/F 139a to which this STB 501 is connected (Step 1012). In this case, it is possible to view the cable television broadcast received by the STB 501 again. Meanwhile, no switching is performed in Step 1012, since the input of the switch 137 is the data input I/F 139a from the beginning.

Through the above operations, the transition of screens displayed on the television 131 will be the one as shown in FIG. 4 as in the case of the first embodiment. Furthermore, since the operation performed by each apparatus when the display of the menu screen of the DVD recorder 101 starts/ends is the same as the one shown in the flowchart of FIG. 13, the transition of screens displayed on the television 131 in such case will be the one as shown in FIG. 5 as in the case of the first embodiment.

As described above, according to the fourth embodiment, even when the television 131 includes only one data input I/F, it is possible to automatically switch the input of the television 131 to a cable television broadcast received by the STB 501 when the output of the DVD recorder 101 returns to the EE screen, only in the case where the manufacturer of the STB 501 is a predetermined manufacturer.

Note that the order of Step 1002, Step 1003 and Step 1004 in the flowchart of FIG. 13 may be interchanged, or these may be performed at the same time. Similarly, the order of Step 1007, Step 1008 and Step 1009 may be interchanged, or these may be performed at the same time.

Furthermore, the DVD recorder 101 may include an external input I/F for establishing a connection with an external apparatus, such that video/audio data outputted from the external apparatus and a television broadcast received by the tuner 103 can be switched therebetween.

Furthermore, a recording medium recorded and reproduced by the DVD recorder 101 is not limited to a DVD-RAM disc, and thus it may be another removable medium such as a DVD-R disc, or may be a fixed medium such as a hard disk. The DVD recorder may be a recording/reproduction apparatus capable of performing recording and reproduction of one or more types of recording media. The DVD recorder may not include the encoder, and a reproduction-only apparatus such as a DVD player that performs only the reproduction of a recording medium such as a DVD-RAM, may be adopted in replacement of the DVD recorder.

Furthermore, the DVD recorder 101 may not include the tuner. In this case, a predetermined screen as shown in FIG. 6 is set to be outputted when the reproduction of the DVD-RAM disc is not carried out, and a start output instruction command is set to be outputted to the STB 501 when the screen returns to such predetermined screen.

In the above description, although the television 131 includes only one data input I/F, it may include two or more data input I/Fs. These data input I/Fs may be of the same type or of different types. Furthermore, the number of apparatuses that can be connected to the data input I/Fs at the same time may be either one or more. In other words, it is acceptable as long as it is possible to identify the apparatus which has sent the command received by the command sending-receiving I/F 140a and to switch the input of the television 131 to such apparatus having sent the command.

In the above description, although the switching apparatus 701 includes two data input I/Fs, it may include three or more data input I/Fs. These data input I/Fs may be of the same type or of different types. In other words, it is acceptable as long as it is possible to identify the apparatus which has sent the command received by the command input I/Fs and to switch the input of the switching apparatus 701 to such apparatus having sent the command.

In addition, although the structure in which the television 131 includes the tuner 136 has been shown as an example, the present invention is not limited to this. In other words, the television 131 may be a monitor that only displays video inputted from an external apparatus.

In addition, the types of television broadcasts that the DVD recorder 101, the television 131 and the STB 501 can receive may be of the same type or of different types.

In addition, information for identifying an apparatus that is to start output may be included in a start output instruction command, and the DVD recorder 101 may send such start output instruction command to an external apparatus such as the switching apparatus 701. In such case, upon receiving the start output instruction command, the switching apparatus 701 may switch the output from the switching apparatus 701 to the video/audio data from the apparatus that is to start output, the apparatus being indicated in the start output instruction command.

Moreover, the number of cables making up the respective data cables and command cables may be either one or more, or a bundle of plural signal wires may serve as a single cable. In addition, a structure may be adopted in which data is transmitted as a wireless signal such as an infrared signal, rather than by using cable.

Furthermore, in the fourth embodiment, although it is determined whether the manufacturer of the STB 501 is a predetermined manufacturer, it may be also determined whether its model is a predetermined model and further whether its version is a predetermined version, in addition to determining whether its manufacturer is a predetermined manufacturer. Since this point has been described in the second embodiment, its detailed description will not be given here.

The decoder 106 in the embodiments is one example of the reproduction unit in the present invention. The data output I/F 109 in the embodiments is one example of the data output unit in the present invention. The command sending-receiving I/F 110 in the embodiments is one example of the command sending unit in the present invention. The encoder 105 in the embodiments is one example of the conversion unit in the present invention. The disc management unit 104 in the embodiments is one example of the recording unit in the present invention. The menu screen in the embodiments is one example of the utility screen in the present invention.

INDUSTRIAL APPLICABILITY

As examples of industrial applications, the apparatus according to the present invention is also applicable for use as a VTR, a DVR, and the like which are required to automatically switch the input of a television to an output from a broadcast receiver such as an STB.

The invention claimed is:

1. A reproduction apparatus that reproduces video or audio data, said reproduction apparatus being connected to a first apparatus and a second apparatus, wherein:
upon receiving a notification command notifying that output of video or audio data is to start, the first apparatus switches its input to receive an output from one of said reproduction apparatus and the second apparatus which has sent the notification command;
upon receiving an instruction command instructing that output of video or audio data should be started, the second apparatus sends the notification command to the first apparatus; and
said reproduction apparatus comprises:
a reproduction unit operable to reproduce video or audio data recorded in a recording medium;
a data output unit operable to output the reproduced video or audio data to the first apparatus; and
a command sending unit operable to send the instruction command to the second apparatus to cause the second apparatus to send the notification command to the first apparatus and, consequently, to cause the first apparatus to switch its input from said reproduction apparatus to the second apparatus such that the first apparatus receives the output from the second apparatus, when the output of the reproduced video or audio data from said data output unit ends.

2. The reproduction apparatus according to claim 1, wherein:
the second apparatus sends, to said reproduction apparatus, a connection command indicating that the second apparatus is connected to the first apparatus; and
said command sending unit is operable to send the instruction command to the second apparatus only in the case where the connection command has been received by said reproduction apparatus.

3. The reproduction apparatus according to claim 1, further comprising
a screen creation unit operable to create a utility screen;
wherein said data output unit is operable to output the created utility screen to the first apparatus; and
said command sending unit is operable to send the instruction command to the second apparatus when the output of the created utility screen ends.

4. The reproduction apparatus according to claim 1, wherein:
the second apparatus sends, to said reproduction apparatus, a manufacturer command, which is a command indicating a manufacturer of the second apparatus; and
said command sending unit is operable to send the instruction command to the second apparatus only in the case where the manufacturer indicated by the manufacturer command is determined by said reproduction apparatus to be a predetermined manufacturer.

5. The reproduction apparatus according to claim 1, further comprising:
a conversion unit operable to convert a received television broadcast into video or audio data in a predetermined format; and
a recording unit operable to record the video or audio data obtained through the conversion into the recording medium.

6. A reproduction system for reproducing video or audio data, said reproduction system comprising:
a first apparatus which, upon receiving a notification command notifying that output of video or audio data is to start, switches its input to receive an output from one of a second apparatus and a reproduction apparatus which has sent the notification command;
said second apparatus which, upon receiving an instruction command instructing that output of video or audio data should be started, sends the notification command to said first apparatus; and
said reproduction apparatus which reproduces video or audio data recorded in a recording medium, outputs the reproduced video or audio data to said first apparatus, and sends the instruction command to said second apparatus to cause said second apparatus to send the notification command to said first apparatus and, consequently, to cause said first apparatus to switch its input from said reproduction apparatus to said second apparatus such that said first apparatus receives the output from said second apparatus, when the output of the reproduced video or audio data ends.

* * * * *